Jan. 5, 1943.  S. BRAND  2,307,105
CALCULATING MACHINE
Filed June 12, 1941   9 Sheets-Sheet 1

Jan. 5, 1943.  S. BRAND  2,307,105
CALCULATING MACHINE
Filed June 12, 1941  9 Sheets-Sheet 2

INVENTOR
Samuel Brand
ATTORNEY

Jan. 5, 1943.　　　　　S. BRAND　　　　　2,307,105
CALCULATING MACHINE
Filed June 12, 1941　　　　　9 Sheets-Sheet 3

INVENTOR
Samuel Brand
BY
ATTORNEY

Jan. 5, 1943. S. BRAND 2,307,105
CALCULATING MACHINE
Filed June 12, 1941 9 Sheets-Sheet 4
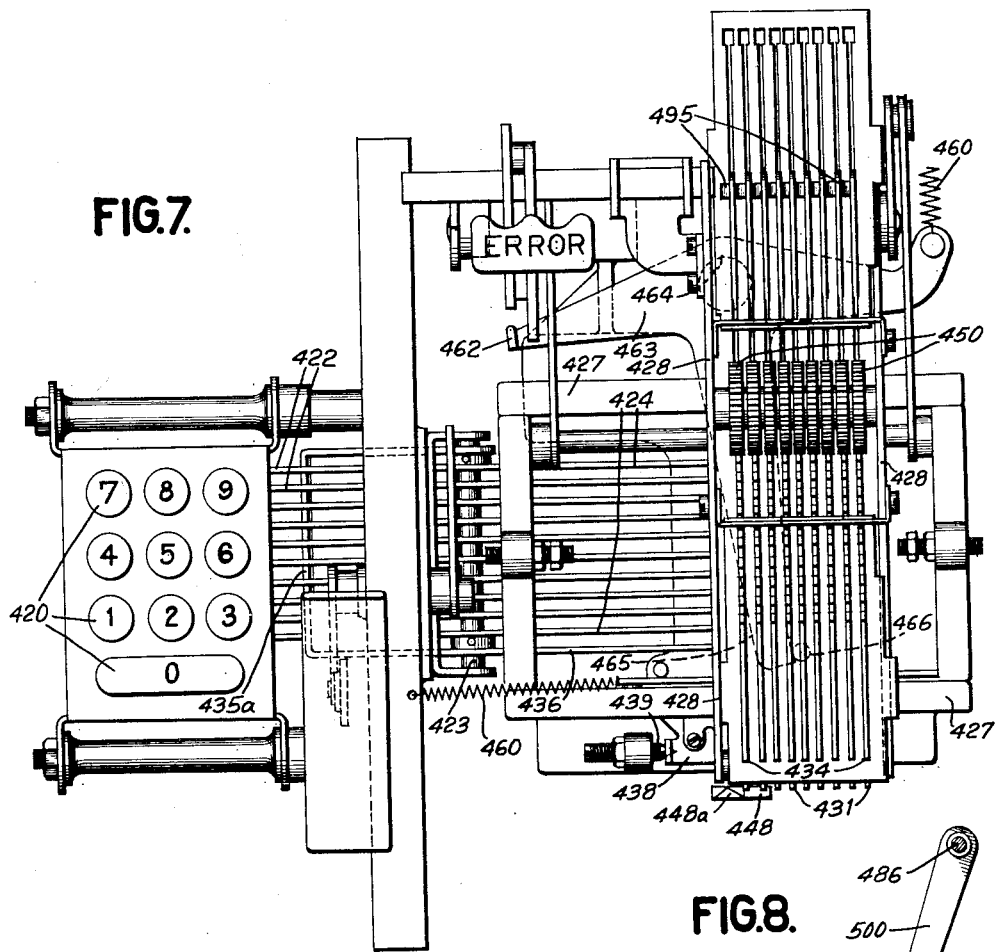
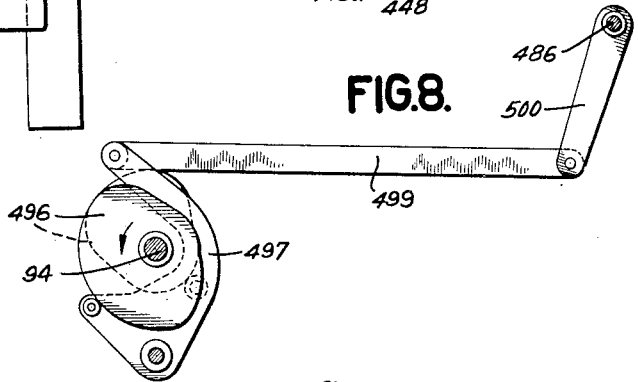
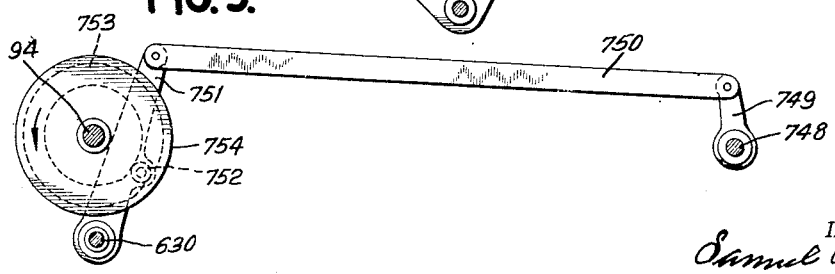
INVENTOR
Samuel Brand
BY
ATTORNEY

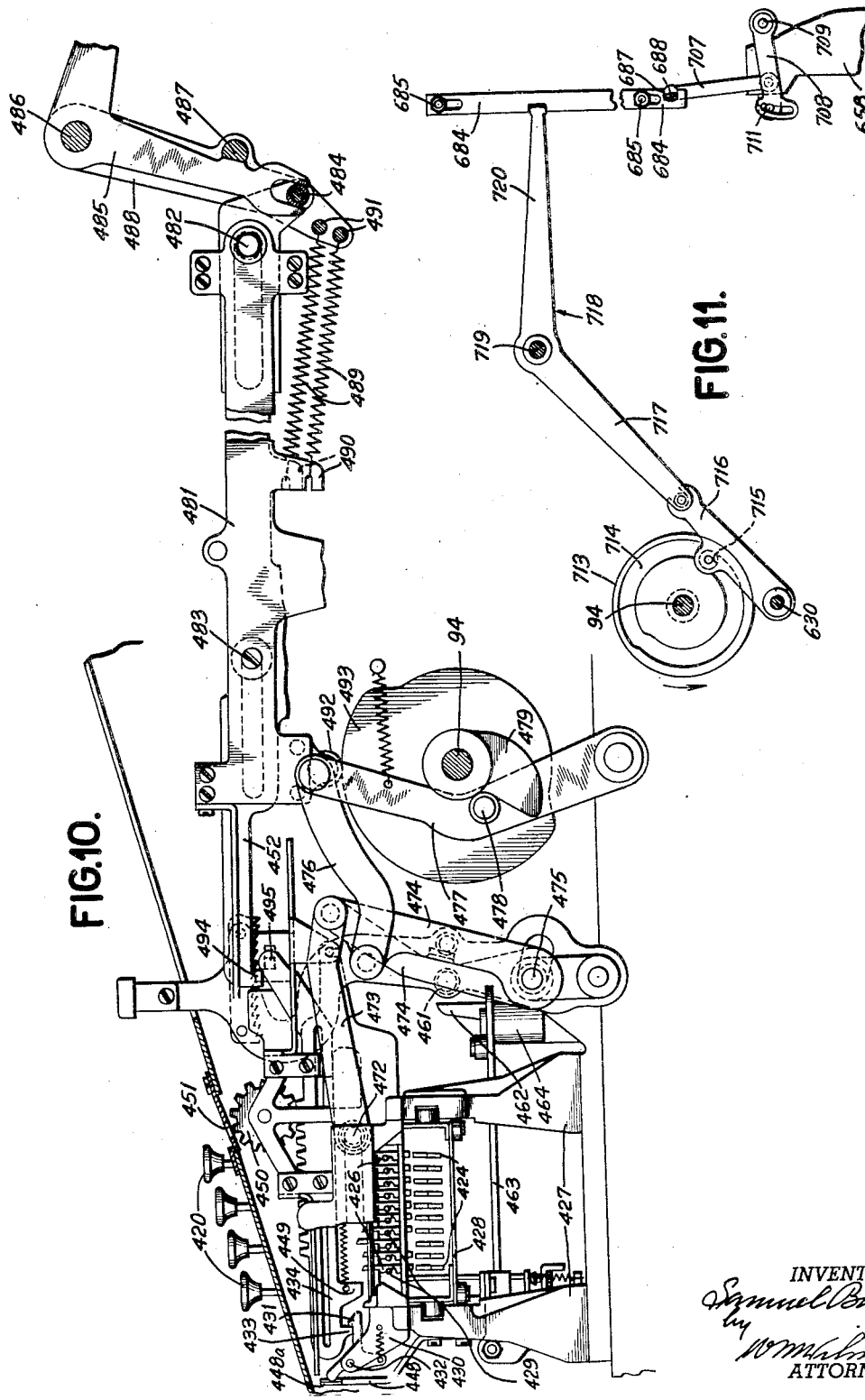

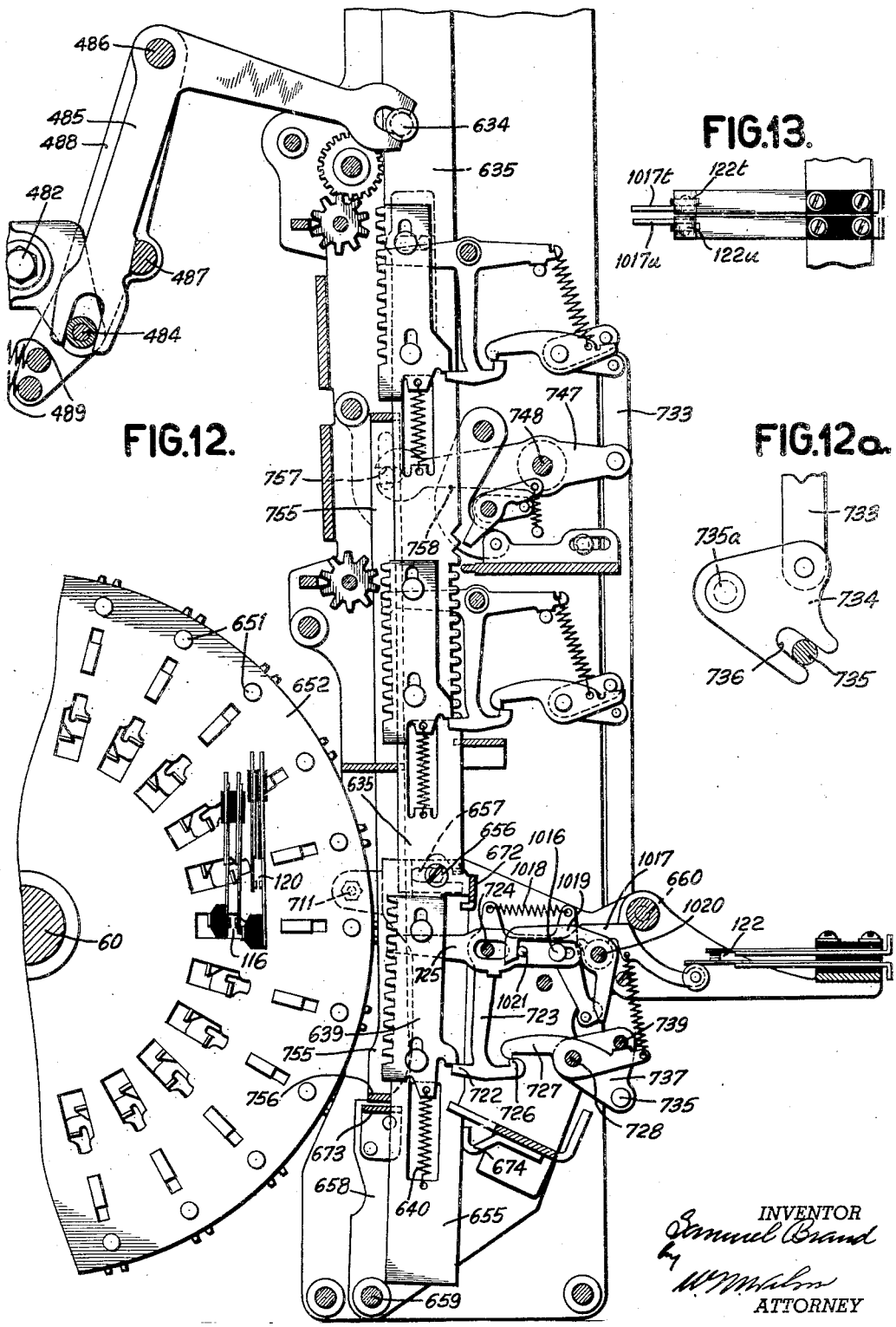

Jan. 5, 1943.   S. BRAND   2,307,105
CALCULATING MACHINE
Filed June 12, 1941   9 Sheets-Sheet 7
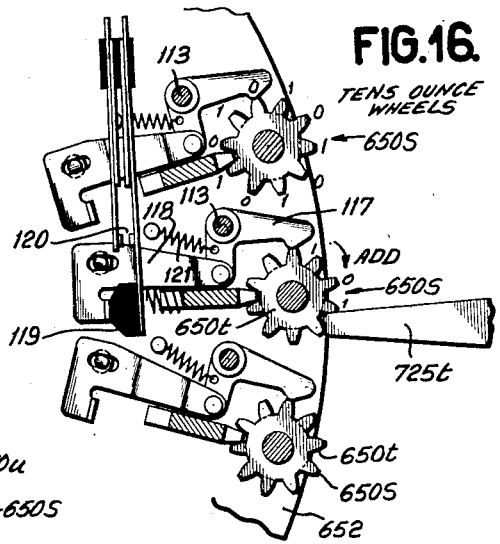
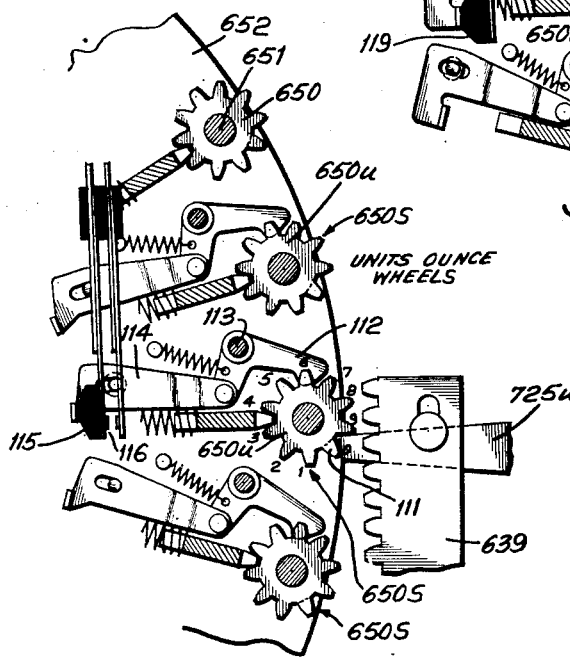
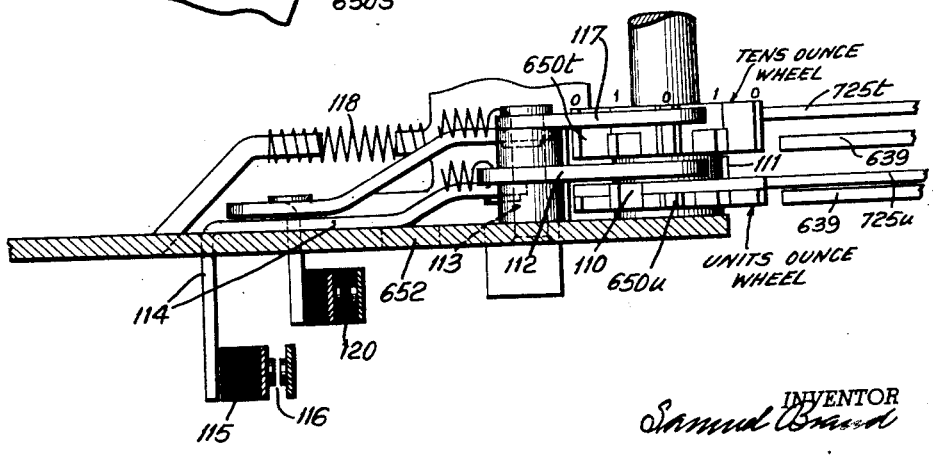
INVENTOR
Samuel Brand
BY
ATTORNEY Jan. 5, 1943. S. BRAND 2,307,105
CALCULATING MACHINE
Filed June 12, 1941 9 Sheets-Sheet 8

INVENTOR
Samuel Brand
BY
ATTORNEY

Jan. 5, 1943.   S. BRAND   2,307,105
CALCULATING MACHINE
Filed June 12, 1941   9 Sheets-Sheet 9

INVENTOR
Samuel Brand
BY
ATTORNEY

Patented Jan. 5, 1943

2,307,105

UNITED STATES PATENT OFFICE 2,307,105

CALCULATING MACHINE

Samuel Brand, Binghamton, N. Y., assignor to International Business Machines Corporation, New York, N. Y., a corporation of New York Application June 12, 1941, Serial No. 397,712

3 Claims. (Cl. 235—58)

This invention relates to calculating machines and more particularly to the types which are adapted to receive entries according to the decimal system, and also to accumulate entries according to lbs. and oz. which are according to the avoirdupois system, although as will be obvious later, the arrangement is not necessarily limited to this system.

A principal object of the present invention is to effect the provision of means whereby a plurality of totalizers may be selected so that certain totalizers may receive entries according to the decimal system, or dollars and cents, and certain other differently constructed totalizers may receive entries according to lbs. and oz. under control of a common keyboard.

A still further object of the present invention is to devise and construct a totalizing mechanism which is capable of receiving entries according to the avoirdupois system without necessitating any changes in the rack actuating mechanism for the totalizers, the changes being principally in the totalizers themselves, whereby the accounting machine may be adapted to receive entries according to the two aforesaid systems with little change in the basic parts of the machine.

It is another object of the present invention to devise a totalizer so that it will receive entries according to lbs. and oz. in a decimal totalizer in which the number of actuating teeth are unchanged, lending the totalizer to be actuated by the ordinary rack system for the usual decimal totalizers. In this respect, it is a coordinate object of the invention to automatically convert the decimal entries to lbs. and oz. when the received entries are not according to the notation of the avoirdupois system.

To make the latter more clear, the machine may enter the digit 6 representing six oz. The three totalizers will represent –006– or no lbs., six oz. If 9 is then entered, the tens transfer or carry between the two lower orders will cause the totalizer to represent –015– or no lbs., 15 oz. This is still the notation in the avoirdupois system. Any further entry will cause the digits represented to be meaningless in this system, although correct for the decimal system. For example, after "2" is added, the totalizer will represent –017– and thereupon there is an automatic conversion to lbs. and oz.

In the present arrangement, this is preferably carried out by adding "4" automatically and with "4" added to 17, there will be represented –021– but since the tens of ounces wheel can digitally represent 0 or 1, alternately, in this instance, it will now represent "0" instead of "1". The transitional carry will cause the third or lb. wheel to receive a units carry to represent "1". The wheels now represent –101– or 1 lb., 1 oz. which is correct.

Aside from the usual tens or units carry which operates from the lower first order to the second order when the first wheel passes from 9–0, and also alternately by the second or tens of ounces wheel passing from 1–0, there are special sensing devices which determine when the units of ounces wheel passes through six, and also when the tens of ounces wheel goes from 0–1, and then 1 to 0. Both of these sensing devices determine the automatic entry of "4" for the conversion to lb. and oz.

Other objects of the invention will be pointed out in the following description and claims and illustrated in the accompanying drawings, which disclose, by way of example, the principle of the invention and the best mode, which has been contemplated, of applying that principle.

In the drawings:

Fig. 7 is a plan view of the ten key setting mechanism.

Figs. 8 and 9 each show operating mechanism for the machine controlled by their respective cams.

Fig. 10 is a longitudinal sectional view showing the ten key setting mechanism and associated settable slides for setting the differential racks for controlling entries in the selected totalizers.

Fig. 11 is a detail view of the operating mechanism for shifting the actuating racks to engage the latter with a selected totalizer.

Fig. 12 is a longitudinal sectional view of the machine showing, particularly, the actuating devices for the totalizer actuating racks associated with a plurality of totalizers and also the associated tens transfer mechanism.

Fig. 12a is a detail view showing certain parts involved in the tens transfer mechanism.

Fig. 13 is a plan view showing in detail certain contacts involved in the electrical circuits for the machine.

Fig. 14 is a plan view on an enlarged scale showing, particularly, the construction and formation of the teeth of the wheels receiving the units and tens of ounces and also the associated contact operating mechanism.

Fig. 15 is a sectional view of part of the totalizer carrying drum, the section being taken so as to show the construction of the units oz. wheels of a plurality of totalizers and also to show the associated contact operating mechanism.

Fig. 16 is a sectional view taken to show the construction of the tens of oz. wheels and the associated contact operating mechanism.

Figure 17:
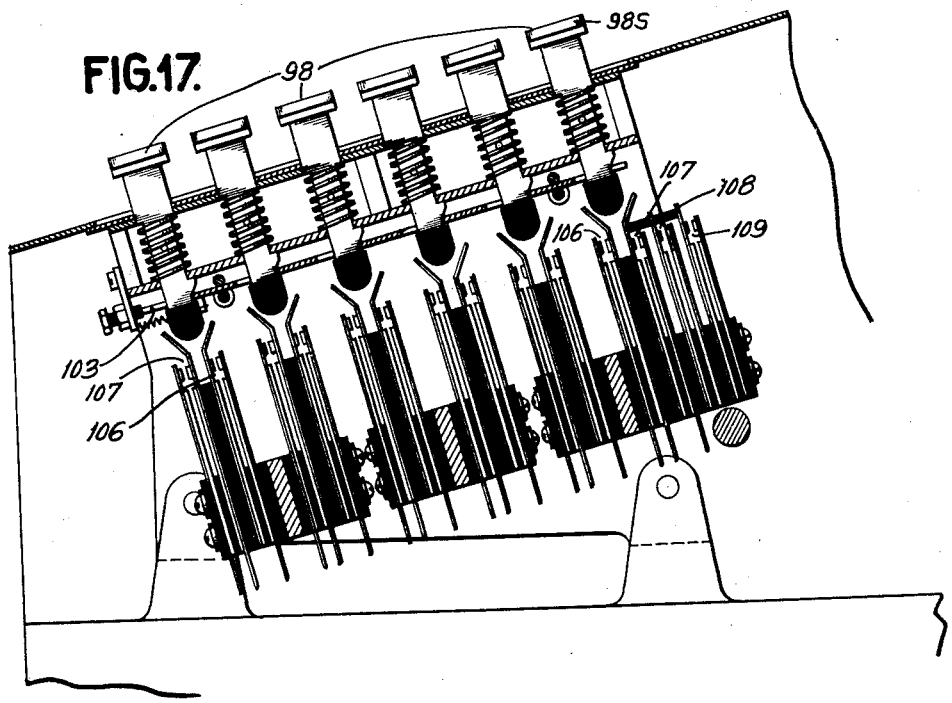

Fig. 17 is a sectional view taken through a row of the totalizer selecting keys showing the various contacts controlled and operated thereby.

Figure 18:
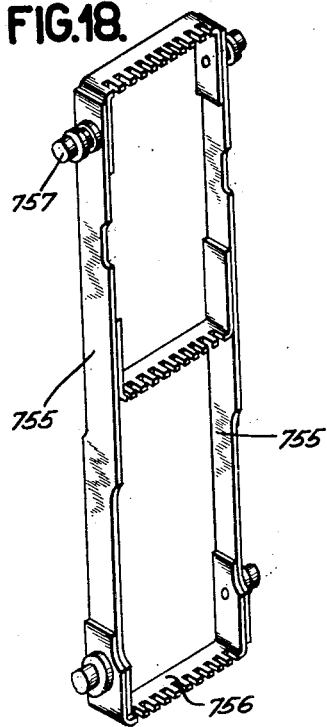

Fig. 18 is a perspective view of a frame utilized in connection with the tens transfer mechanism.

Figure 19:
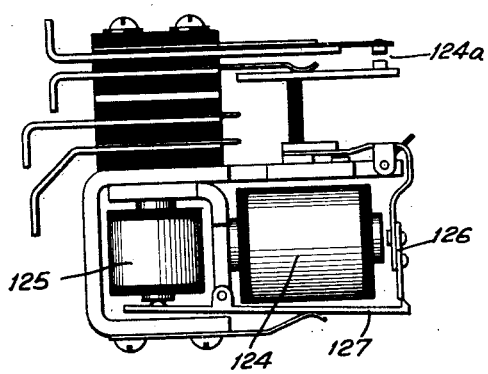

Fig. 19 is a detail view showing the construction of a combined relay and restoring relay involved in the electrical part of the machine.

Figure 20:
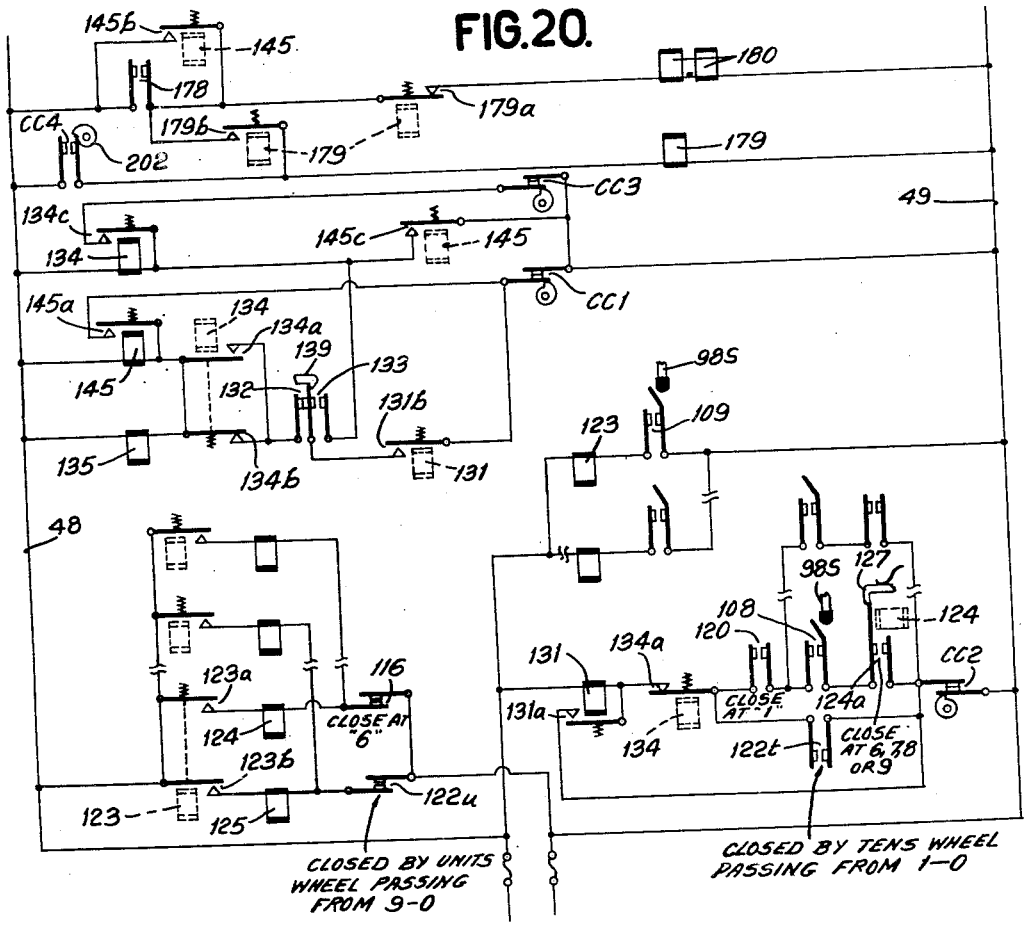
Figure 21:
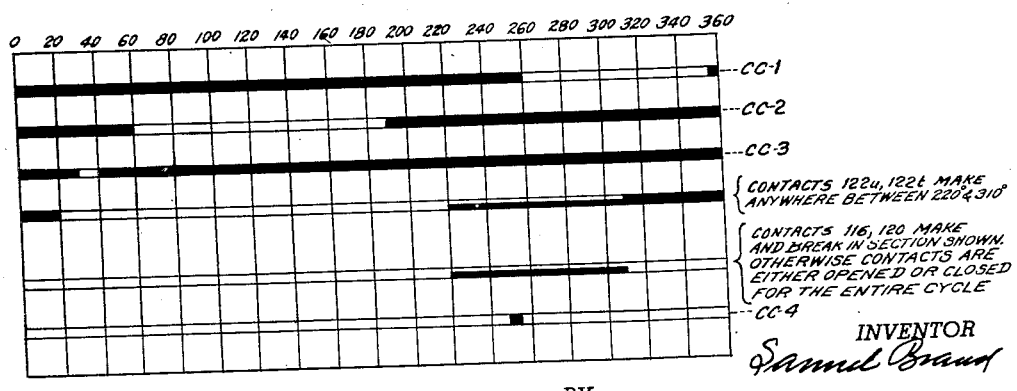

Fig. 20 is an electrical wiring diagram of the machine and,

Fig. 21 is a timing diagram showing the timing of certain cam operated contacts involved in the electrical apparatus and also shows the timing of other contacts which are involved in the entry of amounts according to lbs. and oz.

General operation of machine

The present improvements are preferably applied to the form of combined record sorting and accounting machine shown in the U. S. Patents No. 1,966,623, issued to F. L. Fuller, dated July 17, 1934, and No. 2,142,352, issued to F. L. Fuller and S. Brand, dated January 3, 1939, but it is to be understood that the present disclosure is merely illustrative.

The present machine is also to be considered as an improvement over the combined record sorting machine shown in the aforementioned U. S. Patent No. 2,142,352, in the arrangement for entering items according to pounds and ounces. In order to better understand the present improvements, there will be given a general description of the construction and operation of the machine shown in this patent.

Figure 1:
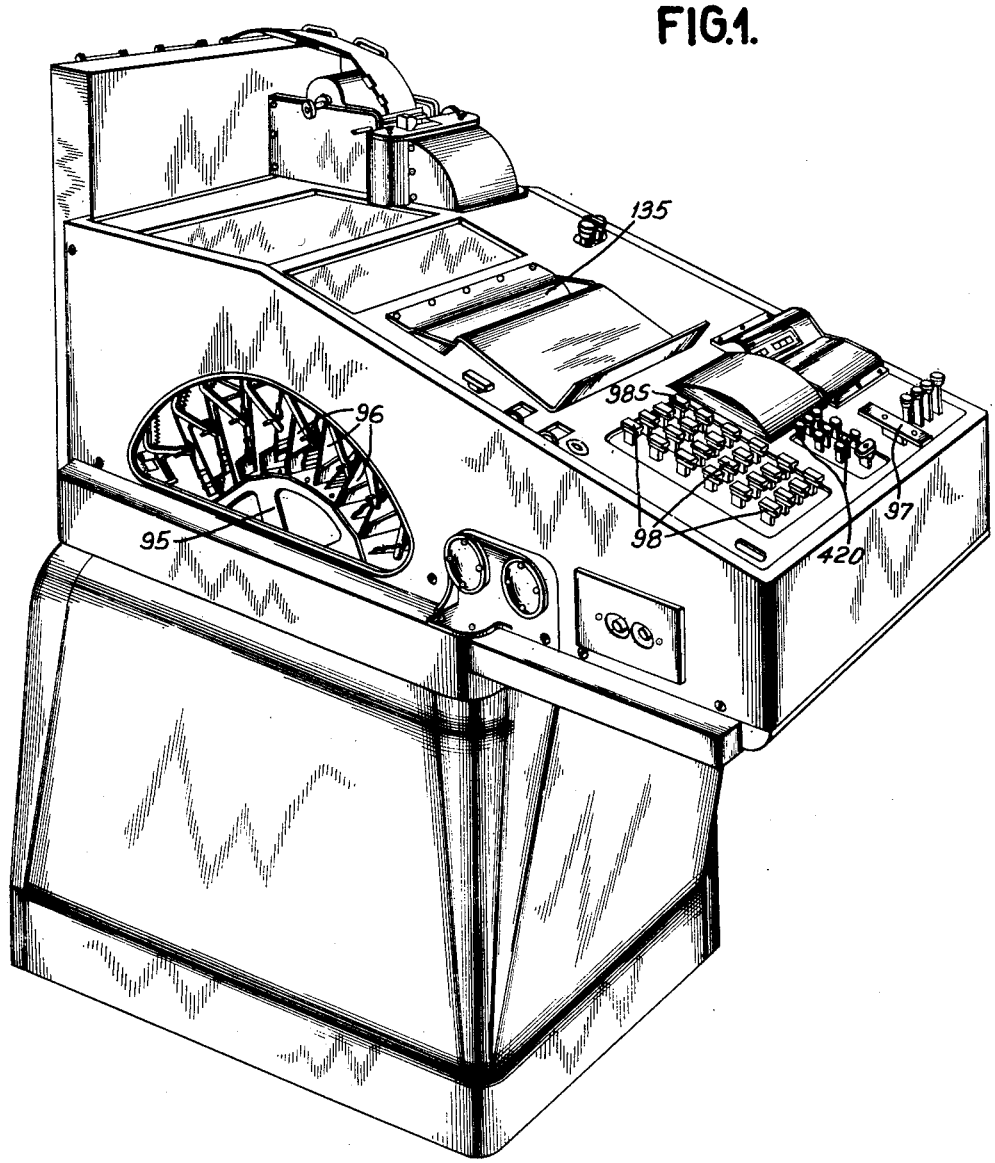
Fig. 1 is a perspective view of the assembled combined sorting and accounting machine to which the present improvements are preferably applied.

The assembled sorting and accounting machine is shown in Fig. 1 and represents the form of machine which is now used commercially in banks to simultaneously list and sort a group of promiscuously arranged records such as checks. The operator is provided with a series of checks which have different classifications and in accordance with their classifications, one of the compartment selecting keys 98 is depressed. Through a control mechanism, a drum 95 is rotated so as to bring a selected check sorting compartment 96 into registration with an aperture 135 in which the check to be sorted is inserted. The function of the machine shown in the aforementioned patents is to effect the entries of the amounts on the records selectively in a plurality of totalizers and to cause the listing of amounts on the checks or records upon a control tape 94 and also upon separate record tapes which are associated with the plurality of sorting compartments. To provide for the entry and listing of the amounts, the machine is provided with ten keys 420 which are initially depressed so as to control the setting on suitable setup mechanism of amounts equal in value to the keys struck. After the amount has been set up on the setup mechanism, the operator then inserts the record in the aperture 135 and then depresses a motor release bar 97. A number of functions are then performed, one of which is the feeding of the inserted record into the selected compartment and also, the positioning of totalizer actuators and printing mechanism in order that the amounts may be entered in the grand and group totalizers and selectively in a plurality of totalizers which are associated with the compartments 96 and, furthermore, one of a plurality of printing mechanisms associated with the compartments will be selected for operation so as to print the amount on the selected compartment tape. An auxiliary printing mechanism is concomitantly adjusted so as to print the same amount on the control tape 94.

The machine is provided with twenty-four totalizers which correspond in number to the number of sorting compartments in the sorting drum and the individual compartment totalizers and printing mechanisms. In the prior machine, all of these totalizers accumulated amounts according to the decimal system, i. e., dollars and cents, but in special circumstances it is preferable to provide for the accumulation of amounts according to pounds and ounces, represented on records to be sorted. To this end, one of the compartment selecting keys 96S (Fig. 17) selects a related totalizer which is devised to accumulate amounts according to this system, but if so desired more than one key 98 can be used and the related totalizers also arranged to accumulate such entries. The totalizer associated with this key 96S will, of course, give the total of the amounts entered according to pounds and ounces.

It is thought unnecessary to disclose herein or give further details of the description of the construction and operation of the sorting machine with regard to the manner in which records are sorted, or the manner in which the totalizers are selected, or for printing upon the various control tapes.

The present disclosure will, therefore, be confined to the description of the setup mechanism and differential entry mechanism controlled by the keys 420 for controlling the entry of decimal amounts and pounds and ounces amounts. It is to be understood that for such entries there will be a sorting operation which will cause the depositing of the related records into a related sorting compartment 96.

For a complete description of the totalizing and printing mechanism for the check sorting machine to perform the functions previously described, reference should be had to the patent to Fuller, No. 1,966,623 and especially to the patent to Fuller et al. No. 2,142,352.

The ten-key keyboard mechanism for setting up amounts represented on the checks to be sorted is best shown in Figs. 4, 6, 7, and 10 inclusive and so much of this mechanism as is necessary to understand its correlation with the present invention is disclosed and described herein.

After a key 98 corresponding to a compartment adapted to receive the record has been depressed, and prior to the depression of the motor release bar 97, the amount of the record is set up in the machine. The purpose of this setup mechanism being to cause the entry of the amount in a totalizer related to the compartment selected and the printing of the amount on a tape, so that the tape will exhibit all of the amounts of the records deposited in the associated compartment, and the totalizer will give the total of such amounts.

Ten key setup mechanism

The machine includes ten numeral keys 420 which are arranged in a conventional ten-key keyboard arrangement and upon the protruding ends of the slidable key stems 421. Each key stem 421 (Fig. 4) has a pin and slot connection to key levers 422 pivoted on a rod 423 so that when a key stem is depressed, the extremity 424 of the key lever 422 is raised and against the action of a spring 425.

In the differential mechanism the setup pins or stops 426 are arranged in transverse series in which all the pins in each transverse series (Fig. 4) represent the same digit, and the pins are also arranged in longitudinal series (Fig. 10) in numerical order, and all the pins are capable of being selectively set to limit the movement of actuating devices.

As best shown in Fig. 7 slidably mounted in horizontal standards 427 is a frame plate 428 of a pin setup carriage through which the extremities 424 of the key levers 422 project so as to selectively actuate and elevate a pin or stop 426 of the longitudinal series by the depression of a key. The stops 426 are carried by said frame 428 and are guided by upper and lower plates of the frame 428. The stops 426 are raisable and will be retained in elevated position by pins 429 (Fig. 10) of a spring urged detent plate 430, there being one detent plate 430 for each longitudinal series of stops 426.

Pivotally mounted at 432 on each detent plate 430 is a spring urged hook or latch member 431 engaging a shoulder 433 of a rack 434 slidably mounted in the frame 428. A spring 435 attached to the rack 434 urges the latter to the right to cause the normal engagement of the hook of the latch 431 with the shoulder 433. Obviously, as a stop 426 is raised the notch therein will, by its cooperation with the pin 429, force the detent plate 430 to the left against the action of a spring connected thereto and through the hook 431 the rack 434 will be shifted slightly to the left against the action of spring 435, and the pin 429 therefor retains the raised stop 424 in elevated position, as is shown for the raised digit stop 424 in Fig. 10 having the numerical value of "2."

Figure 6:
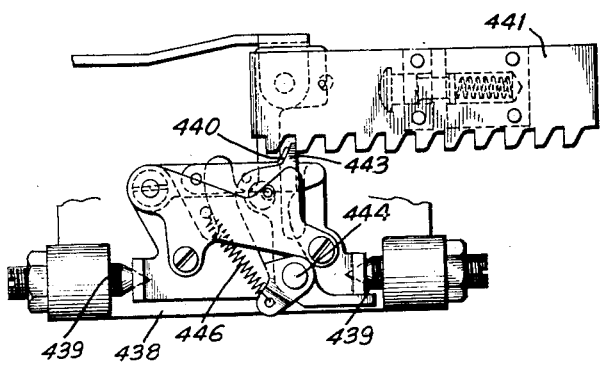
Fig. 6 is a detail view of the escapement mechanism utilized for the ten key setting mechanism.

Underlying each key lever 422 is a bail 435a (Fig. 4) for operating an escapement mechanism and said bail has a projecting portion 436 carrying a screw 437 which is adjustable for timing the escapement mechanism shown in detail in Fig. 6.

The escapement mechanism comprises a plate 438 (Fig. 6) pivoted by trunnions 439 and integral with the plate 438 is an escapement dog 440 normally below an escapement rack 441 carried by the frame 428. During the downward depression of a key the screw 437 being below an integral extension 442 (Fig. 4) of the plate 438 will rock plate 438 about its pivot raising the dog 440 so as to engage a tooth of the rack. At the same time an escapement dog 443 pivoted at 444 to the plate 438 is lifted out of engagement with the tooth it previously engaged and which is now engaged by the dog 440. The dog 443 now being above the plane of the rack 441 will be rocked clockwise by its spring 446 to overlie the next tooth space of the rack 441. During the restoration of the depressed key, a spring 447 (Fig. 4) will return the plate 438, and dog 440 will now be shifted below the rack 441 and dog 443 will now be in cooperation with the successive tooth space. The frame 428 now being released by the dog 440 is now shifted by a normally tensioned spring 460 (Fig. 7) connected to the frame 428 to an extent of one tooth space of the rack 441 under control of the dog 443. This form of escapement mechanism is well known and is only generally described herein.

Figure 4:
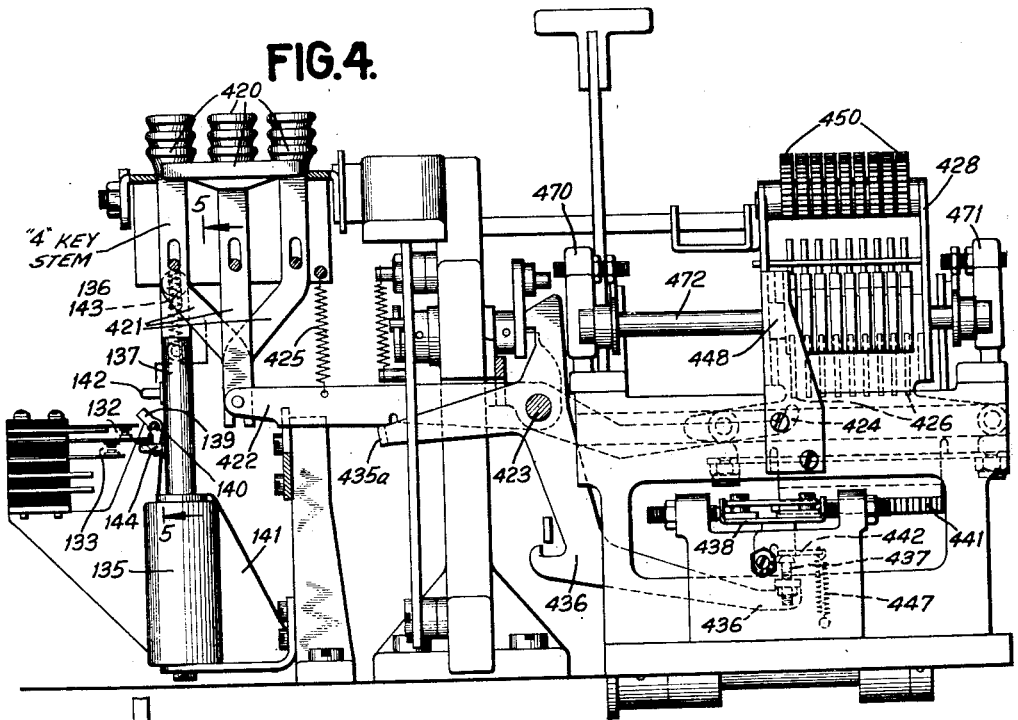
Fig. 4 is a view in front elevation of the ten key setting mechanism for setting up the amounts represented on the records and which amounts are to be entered in the totalizers according to decimal amounts or according to lbs. and oz.

Referring to Figs. 4, 7, and 10, a fixed plate 448 is provided with a camming portion 448a which is adapted to rock the latch arm 431 (see Fig. 10) with which it is in cooperation, unlatching it from the rack 434 which is then shifted by the related spring 435 until a shoulder 449 of the rack abuts the raised stop 426. Each rack 434 meshes with a gear 450 having thereon numeral indicia visible through a slot 451 so that the numerical value of the previously depressed key is exhibited.

As will be subsequently explained the successive positions of racks 434 set up under control of the ten keys 420 control the differential position of slides 452.

After the setting of the stops 424 has been utilized, the raised stops are depressed to normal and the carriage returned to normal by the following means. Guided in slots in side frames 470 and 471 (Fig. 4) is a rod 472 to which is connected links 473 (Fig. 10) which are connected to arms 474 pivoted at 475. To one of said arms 474 there is connected a link 476 connected to a follower arm 477 carrying a roller 478 in engagement with a profile cam 479 secured to a drive shaft 94. When said shaft is turned under control of the depression of the motor release bar 97 previously described by means shown in Patent No. 2,131,912 and to be subsequently explained herein, the cam 479 will cause the rod 472 to be moved to the left to engage with the upper beveled portions of the raised stops 426 thus depressing them to normal position and also thereafter engaging the shoulders 449 of the racks 434. The latter are moved back by the rod 472 to normal position where they are relatched by the latch arms 431.

For returning the frame 428 to normal position where it is held in such position by the escapement mechanism one of the arms 474 carries a pin 461 (Fig. 10) which engages an upward extension 462 of a bell crank 463 pivoted at 464 (see Fig. 7). The arm 465 of the bell crank 463 engages a pin 466 carried by the frame 428 and as the bell crank 463 is rocked the frame 428 will be returned to normal position and thus retensioning the spring 460.

*Differentially operated operating mechanism controlled by the setup mechanism for effecting entries in accumulators, setting printing mechanisms, etc.*

It will be recalled that the machine includes a differential mechanism which is controlled by the setup mechanism for effecting entries in the selected accumulators, and such differential mechanism will be described herein in order to make it more clear that the setup mechanism will normally control the entries in the accumulator, set up the printing mechanism, etc. so that the present improvements will be more clearly understood when their description is given.

Referring to Fig. 10, a series of slides 452 are slidably mounted in a frame including side plates 481 having their right ends pivoted to embrace a stud 482. The left ends of the slides 452 are slotted and are slidably mounted by these slots by a rod 483 carried by the side plates 481 of the frame.

Each of the slides 452 carries a stud 484 at its right end which stud is embraced by the bifurcated end of a related bell crank 485 loosely pivoted on a shaft 486.

The arms 485 are normally pressed against a bail rod 487 carried between a pair of arms 488 secured to the shaft 486, by springs 489 stretched between projections 490 at the lower sides of the slides 452 and rods 491 carried between the arms 488.

One of the frame plates 481 carries a roller 492 which, by the weight of the frame, engages the profile of a cam 493 secured to the main drive shaft 94. During the rotation of the cam 493, the left end of the frame drops to bring projections 494 of the slides 452 into correlation with square studs 495 carried by the now differentially positioned racks 434 so that, by the movement of the slides 452 to the right urged by the springs 489 under control of the bail rod 487, the slides 452 will move to the right until each projection 494 strikes the correlated stud 495.

The means to effect the rocking movement of the rod 487 is shown in Fig. 8 and consists of a pair of complementary cams 496 which are mounted upon the main drive shaft 94 and cooperating with rollers carried by a curved arm 497 pivotally mounted on a rod 630. A link 499 connects arm 497 and an arm 500 secured to the rod 486. Cams 496 first cause the counterclockwise rotation of the arm 488 which carries the bail rod 487. The rocking of the bail rod 487 counterclockwise moves the slides 452 through the springs 489 until the slides are stopped in differential positions. The bail rod 487 continues its counterclockwise movement after the slides 452 are arrested, thus merely stretching the springs 489.

The cams 496 referred to then rock the bail rod 487 reversely to restore the slides 452 to their normal position.

It will be understood, therefore, that a series of bell cranks 485 are given differential positions determined by the setup mechanism and as more fully shown and described in the patent to F. L. Fuller et al., 2,142,352, dated January 3, 1939, and also herein, this differential position of each arm 485 is communicated to a related order of a printing mechanism and accumulating device. It is to be understood, therefore, that the setup mechanism causes the bell cranks 485 to receive differential extents of movement to provide for the proper entry, etc.

Motor release bar

Figure 2:
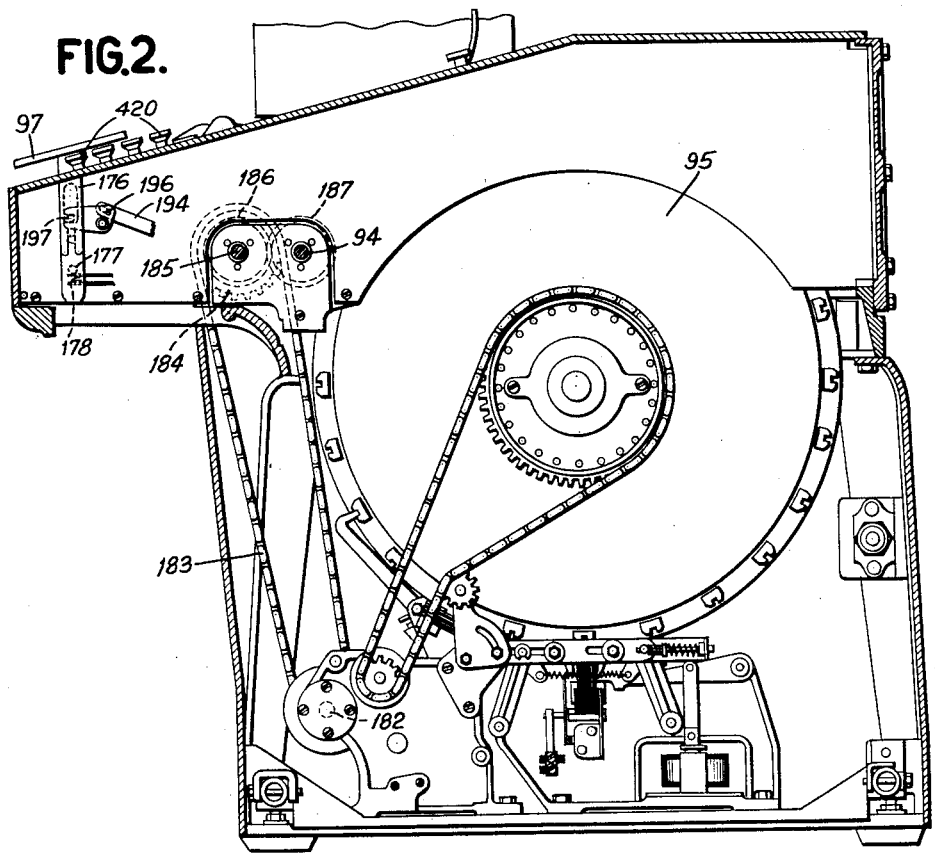
Fig. 2 is a view in side elevation of the right side of the machine, the cabinet cover being broken away to show the interior parts.
Figure 3:
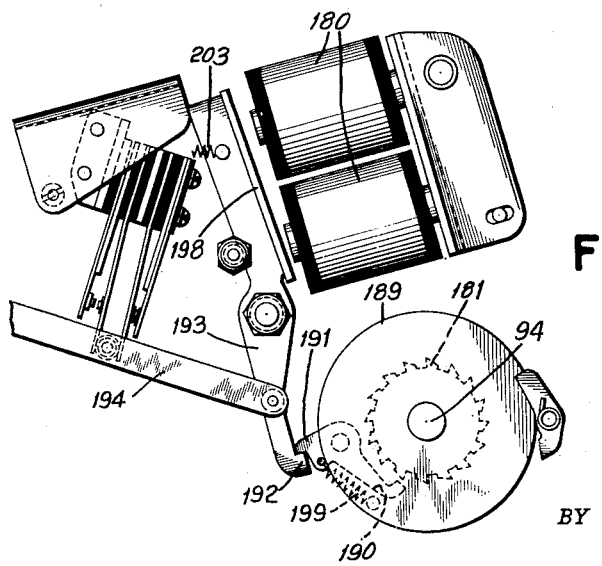
Fig. 3 is a detail view showing the construction of the electromagnetically controlled one-revolution clutch mechanism.

Accumulating operations and other incidental operations are rendered operative when the motor release bar 97 previously referred to is depressed. As best shown in Fig. 1, the motor release bar 97 is positioned exteriorly of the machine for a manual depression. Referring to Fig. 2 the machine includes continually rotated drive shaft 182 and secured to the drive shaft 182 is a sprocket gear, not shown, around which passes an endless chain 183 surrounding a sprocket gear 184 attached to a shaft 185. Attached to said shaft is a pinion 186 meshing with a gear 187 loosely mounted on the shaft 94, to which gear 187 a ratchet wheel 181 (Fig. 3) is secured.

The motor release bar 97 is carried by a slidable key stem 176 carrying a pin 177 which, when the key stem is depressed, closes contacts 178. This completes a circuit as shown in Fig. 20 from the line 48, through contacts 178, relay contacts 179a now closed, clutch control magnets 180 to the line 49, thus causing the energization of the magnets 180.

Attached to the shaft 94 (Fig. 3) is a disk 189 carrying a spring pressed clutch pawl 190, having a tail 191 normally engaged by a shoulder 192 of a clutch control arm 193. By means of a link 194, the clutch control arm 193 is connected to an arm 195 (Fig. 2) by a pin 196 carried by the arm 195 engaging a slot in the link 194, said arm 195 also having a slot receiving a pin 197 carried by the key stem 176.

The result of the above construction is that pin 177 will close contacts 178 when the key stem 176 is depressed to cause the energization of the magnets 180. From Fig. 3, it will be seen that the armature 198 of magnets 180 is integral with the arm 193 so that the energization of magnets 180 will rock the clutch control arm 193 to remove shoulder 192 from the tail 191, thereby permitting a spring 199 to rock clutch pawl 190 into engagement with the ratchet wheel 181, thus rotating the drive shaft 94.

At about 250° rotation of the shaft 94, cam 202 (Fig. 20) carried thereby, will close cam contacts CC4, (see Fig. 21) thereby closing a circuit to a relay magnet 179.

The latter will now open the relay contacts 179a, thereby opening the circuit to the clutch control magnets 180 and even if the motor release bar is held depressed, it will be seen that a spring 203 (Fig. 3) will rock the armature 198 and clutch release arm 193 so that at the completion of one revolution of the disk 189, and shaft 94, the shoulder 192 of the arm 193 will engage the clutch pawl 190 and disengage it from the ratchet wheel 181. In this case, the slot in the link 194 will permit the movement of the link 194 to the left without affecting the movement of the motor release bar 97.

When the stick relay contacts 179b (Fig. 20) close, it will be seen that the circuit for the relay magnet 179 extends back to line 49 to retain its relay contacts 179a open as long as the motor release bar 97 is held depressed. When manual pressure on the motor release bar is relieved, a spring (not shown) will raise the motor release bar and key stem 176, permitting contacts 178 to open to cause the deenergization of relay magnet 179, and also the opening of relay contacts 179b and closing of relay contacts 179a. Thus, only a single revolution of the drive shaft 94 can be effected even if the motor release bar 97 is held depressed.

Keyboard for selection of totalizers

It will be recalled that the machine includes a series of keys 98 which are depressed in accordance with the classification numbers of the records or checks to be sorted and such keys predetermine the differential rotation of a drum 95 to select a sorting compartment and also a related totalizer which are carried by the drum 95. The keys are arranged as shown in Fig. 1 in four rows, each row containing six keys, a row of keys being shown in Fig. 17. The key caps carry suitable indicia to designate the classification numbers. The keys are of the lock-down flexible type, that is to say, when a key is depressed, it will remain latched by a detent plate 103 and the key will remain in its latched position until another key of the keyboard is depressed, which will release the previously latched-down key and concomitantly latch down the newly depressed key. This construction for a keyboard is well known and further description appears to be unnecessary. Each of the keys 98 is adapted to close two pair of contacts 106 and 107 which are closed to control circuits which determine the amount of rotation to be given to the drum 95. The keyboard may be provided with one or more special keys such as the key 98S as shown in Fig. 17. In addition to closing the related contacts 106 and 107, such keys will close additional contacts 108 and 109 which have a function to be described more in detail as the specification progresses. These special keys are adapted to predetermine which totalizers are to be actuated by the differential mechanism for effecting the entry of amounts according to pounds and ounces, instead of the entry of amounts according to dollars and cents which is effected when the other keys 98 are utilized.

Rack operating mechanism

Referring to Fig. 12, the horizontal arm of the bell crank 485 is bifurcated so as to straddle a stud 634 carried by a vertically disposed slide 635. There is a bell crank 485 and vertical slide 635 for each denominational order. The purpose of the bell crank 485 is to transmit the movement of the slide 452 to the vertical slide 635 for the purpose of actuating several totalizers to enter the amounts set up on the keys 420.

The slides 635 are suitably mounted in the framework of the machine and each slide carries a plurality of racks 639, all of which partake of the same differential movement given to the slides 635.

Totalizers

The machine is provided with a series of totalizers 650 which are carried and supported by a disk 652 (Fig. 15) and a disk 652 (Fig. 12), secured to the shaft 60 upon which the sorting drum is mounted. Obviously, when the sorting drum is rotated under control of the selecting keys 98, the corresponding totalizer 650 is brought into cooperative relation with the racks 639. Each of the totalizers 650 is carried by shaft 651 mounted in the disks 652.

In view of the fact that the present invention concerns only the totalizers 650, these will be described in detail with particular reference to their construction and the actuating mechanism therefor. The invention is, however, not concerned with the totalizers 675 and 676 and these, if utilized, will be actuated in the manner explained in the patent to F. L. Fuller et al., 2,142,352.

The racks 639 are slidably mounted on short slides 655 (Fig. 12) which, at their upper ends, carry studs 656 projecting through substantially horizontal slots 657 in the lower ends of the vertically disposed slides 635 so that the same movement imparted to the slide 635 will be given to the short slide 655.

The slides 655 are slidably mounted in a frame comprising side plates 658 pivotally supported on a rod 659 and which are tied together by a rod 660. The framework for the actuator racks 639, which consist of the side plates 658, carries the associated carrying mechanism. It is pointed out that the purpose of this framework is to effect a movement of the racks 639 towards the selected totalizer 650 so as to engage the pinions thereof and the manner in which this is effected will now be described in detail.

Rack engaging mechanism

Referring to Fig. 12, the slides 655 which carry the racks 639 are guided by a comb 672 near the upper end of the racks and by a comb 673 secured to the frame plates 658. A bracket 674 also secured to the frame plates 658 assists in guiding the racks 655 in their vertical movement.

Referring to Fig. 11, an adding-engaging slide 684 is mounted to slide vertically on studs 685 projecting from the framework of the machine. The slide 684 is provided with a recess 687 in its right hand edge and a stud 688 carried by a link 707 normally projects into the recess 687. The link 707 is pivoted to a totalizer engaging cam arm 708 which is pivoted upon a stud 709 and the arm 708 is provided with a cam slot engaging a stud 711 projecting from one side plate 658 of the rack frame.

The mechanism for actuating the slide 684 is shown in Fig. 11 and includes a cam 713 fast on the main drive shaft 94. A groove 714 in the cam 713 embraces a stud 715 on a follower arm 716 pivoted on the rod 630 and having a pin and slot connection with one arm 717 of a lever 718 pivoted on a stud 719. The right end of the other arm 720 of the lever 718 projects into a recess in the left hand edge of the adding-engaging slide 684.

At the proper time following the differential positioning of the slides 452, and the vertical slides 655 which carry the actuator racks 639, the cam 713 rocks the arm 716 clockwise which, in turn, rocks the lever 718 counterclockwise to raise the adding-engaging slide 684. Referring to Fig. 11, it is clear that the upward movement of the slide 684 carries the stud 688 and link 707 upwardly therewith and due to the connection of the link 707 with the cam arm 708, this arm is rocked clockwise. By this movement, the cam slot in the arm 708 acting on the stud 711 rocks the frame carrying the totalizer actuator racks 639 to effect the engagement of the latter with the selected totalizer 650. Now, when slides 635 are restored downwardly by the restoration of slides 452 toward the left to their normal position, (see Fig. 10) an amount commensurate to the amount previously set up on the wheels 451 will be entered in the selected totalizer 650.

Shortly after the vertical slides 635 are restored downwardly to effect the item entering operation, the cam 713 (Fig. 11) reverses the position of arm 716 and the lever 718 to lower the adding-engaging slide 684. This downward movement of the slide 684 rocks the cam arm 708 counterclockwise to disengage the actuator racks 639 from the selected totalizer 650.

Transfer mechanism

Means is provided to add a unit to a totalizer wheel of the higher denominational order when the wheel of the next lower order passes from 9 to 0, when certain totalizers of the machine are selected for entry of amounts according to the decimal system. As will be subsequently pointed out, transfers are effected differently when certain other totalizers are selected and which are adapted to receive amounts according to pounds and ounces.

However, in order that this feature of the invention last mentioned may be better understood, there will now be given a description of the operation of the normal tens transfer mechanism provided according to the decimal system. This means includes racks 639 which are permitted to make an additional step of movement downwardly by springs 640 when the slides 635 and racks 639 are moved downwardly to enter the amount in the totalizer. The racks 639 are normally prevented from making this additional step of movement by the engagement of lateral extensions of racks 639 with ears 722 on transfer pawls 723 which are pivoted on a rod 724. A transfer arm 725 is slidably mounted on the rod 724 and on a stud 1016 projecting from a rearwardly extending arm 1017 integral with the pawl 723. A tensioned spring 1018 extended between a projection on the arm 725 and a projection on the arm 1017 urges the arm 725 toward the left, said arm 725, however, being normally prevented from such movement by a hooked lever 1019 fast on a shaft 1020 which is mounted in the frame plates 658. The lever 1019 is provided with a bentover portion which hooks over a stud 1021 carried by the arm 725. This arrangement enables the arm 1017 and the transfer arm 725 to be so connected that they are rocked as a unit, it being noted that the hook of the lever 1019 permits the counterclockwise movement of the arm 725 for the purpose of rocking the pawl 723 to effect a transfer. Each of the arms 725 extends to the left from the rod 724 and forwardly into the path of the usual single transfer tooth provided on each of the totalizer wheels.

As the racks are carried downwardly to effect the rotation of the totalizer wheels, a totalizer wheel may pass from 9 to 0 so that the single transfer tooth thereof strikes the arm 725, rocking the transfer pawl 723 counterclockwise, and since the transfer arm and pawl 723 are interconnected in the manner previously described, the ear 722 will be removed from engagement with the extension of the rack 639 of the next higher denominational order. This rack 639 may then continue its downward movement by spring 640 one additional step to transfer a unit into the totalizer wheel of the next higher denominational order.

When the pawl 723 is rocked counterclockwise, it is held in its retracted position by a spring urged detent 727 loosely pivoted on a rod 728 and which detent 727 engages a tail 726 of the pawl 723.

Those transfer pawls 723 which are knocked down or rocked counterclockwise during an adding operation are retained in their rocked position until moved to unlatching position in the next following adding operation when the detents 727 are rocked clockwise to free the transfer pawls 723 to the action of their springs 1018. The mechanism for restoring the transfer pawls includes the shaft 728 having secured thereto adjacent the detents 727 arms 737 carrying a rod 739 projecting across the plane of the detents 727. A link 733 is pivotally connected to an arm 734 (Fig. 12a) pivoted to stud 735a. The arm 734 is provided with a slot 736, embracing a stud 735 on one of the arms 737. In order to rock the rod 739 to restore the detents 727, a lever 747 secured to a shaft 748 is pivotally connected to the link 733. Secured to the shaft 748 is an arm 749 (see Fig. 9) connected by a link 750 to a follower arm 751 pivoted on the rod 630 and carrying a stud 752 projecting into a cam groove 753 in a cam 754 secured to the main drive shaft 94. Early in the adding operation the cam groove 753 rocks the arm 751 clockwise which movement is transmitted by the link 750, the arm 749, shaft 748, and lever 747 to link 733. The resulting downward movement of the link 733 rocks the arm 734 clockwise which, through the couplings 735 and 736 rocks the arm 737. The shaft 728 and the rod 739 also rock clockwise to rock the detents 727 out of engagement with the transfer pawls 723, to permit the springs 1018 to restore these pawls to their normal position in the path of the racks 639.

Means is also provided to raise the racks 639 to their normal position after they have been advanced an additional step for the purpose of transferring from a lower to a higher denominational order. This means includes a frame comprising side members 755 (see Fig. 18) joined by a cross bar 756 extending just beneath the group of racks 639 (see Fig. 12). One of the upper pairs of studs 757 is embraced by the other arm 758 (Fig. 12) of the lever 747, and when the lever 747 is rocked clockwise to release the transfer pawls 723, the frame comprising the cross bars 756 and the side members 755 is raised, bringing the cross bar 756 into contact with the lower ends of the racks 639, restoring these racks to their normal position. At this time, the pawls 723 are released from the detents, 727, and the ears 722 resume their position beneath the extensions of the racks 639 to maintain the racks in their normal position until a transfer again occurs.

*Construction of special totalizers for accumulating amounts according to pounds and ounces*

The machine is provided with one or more special totalizers, identified in Figs. 15 and 16 by the reference character 650S which designate one or more totalizers which are changed in construction adapting them for accumulation of amounts according to pounds and ounces. It should be noted that Fig. 15 is a sectional view taken through the totalizers which show the units adding wheel 650u for three of the totalizers and Fig. 16 shows the tens wheels 650t for the same three totalizers. In Fig. 15, there is also shown one of the ordinary totalizers 650 which receives items entered according to dollars and cents. Accordingly, if the machine is equipped with three special totalizers, there will be three selectng keys similar to the one designated 98S (Fig. 17) for selection of these totalizers by correlation with the actuating racks 639.

Each totalizer consists of a series of nine accumulating wheels and for the specially constructed totalizers, the first wheel 650u will receive the units entry of the ounces, while the next wheel 650t or the tens wheel will receive the tens of ounces. The next seven wheels are of the ordinary construction for totalizers receiving decimal amounts and these wheels are used for receiving amounts according to pounds. In other words, the maximum capacity of a special totalizer would represent pounds and ounces as follows:

9,999,999—15 ounces

All of the nine wheels are constructed as standard ten tooth wheels so as to be actuated by the racks 639 without requiring any change thereof in the number of teeth or the pitch thereof. However, a special tooth construction for the wheels 650u and 650t is utilized in order to provide for the necessary carries for entries made according to sixteenths or ounces. Referring to Fig. 14, it will be noted that the units ounce wheel 650u is provided with ten teeth which are engaged with the related rack 639. This wheel 650u is provided with a broad tooth 110 which is in the path of the units transfer arm 725u and is actuated thereby when such wheel passes from 9 to 0 in the customary manner. The wheel 650u is also provided with a reduced portion which is provided with a transfer tooth 111 which is also shown in Fig. 15. Assuming that the units ounce wheel 650u is at the zero representing position, if six units are added to this wheel by the actuation thereto by the rack 639, the six steps of movement given to this wheel will bring the transfer tooth 111 to engage one arm of the bell crank 112 which is pivoted upon a rod 113 carried by the disks 652. The bell crank 112 is connected to a slidable plate 114, slidably mounted on the disk 652 and carrying a lug engaging a knob 115 of insulation which is secured to one blade of contacts 116 which are open at all times until the time that the special transfer tooth 111 engages the bell crank 112 and rocks the same counterclockwise so as to draw the plate 114 to the right and thereby close contacts 116. Summarizing, it will be seen that when the special transfer tooth 111 stops or passes through the sixth position of the units wheel, contacts 116 will close.

Referring now to the tens of ounces wheel 650t, it will be noted that this wheel is provided with the usual ten teeth which are in the plane of the tens actuating rack 639. Every other tooth is, however, cut away so that only the teeth representing zero will be able to effect the operation of the tens transfer arm 725t as will be obvious from Fig. 14. The alternate teeth which represent "1" will, of course, not actuate the tens transfer arm 725t so that the tens of ounces wheel can occupy only one of two digit representing positions, either 0 or 1. If the setting is at 1 and an additional 1 or a ten is added, the wheel goes to 0. Likewise, if a carry was made from the units wheel 650u to the tens of ounces wheel 650t and if the latter previously was set at 1, it will move to 0 or it will move to represent "1" if previously set at 0. Whenever the tens of ounces wheel moves from 1 to 0, it causes the actuation of the tens transfer arm 725t so that a unit will be carried to the first lbs. wheel which is the third adding wheel and this will be effected in the customary manner.

Referring now particularly to Fig. 16, it will be noted that also mounted on the rod 113 is a bell crank 117 which is in the rocked position shown when the wheel 650t represents zero and in such rocked position, the bell crank 117 has drawn a slidably mounted plate 118 to the right so that its contact with an insulating knob 119 has, in this instance, opened contacts 120. When the wheel 650t is moved a single step from 0 to 1, the bell crank 117 will be drawn by a spring 121 so as to move the plate 118 to the left to enable contacts 120 to be closed. Summarizing, it will be noted that when any of the five wide "0" teeth of the wheel 650t rock the bell crank 117, it will open contacts 120 but when any of the 5 narrow or "1" teeth of the wheel 650t come to rest under the bell crank 117, the contacts 120 will be closed.

It will be noted that the bell cranks 112 and 117 and related contact operating plates 114 and 118 are mounted adjacent each of the special totalizers 650S and move with the drum since these elements are carried by the disk 652. The contacts 116 and 120 are, however, common to all of the special totalizers 650S and these are suitably mounted upon the stationary framework of the machine so that when anyone of the special totalizers 650S is selected for actuation, the related contact operating mechanism will be associated with the contacts 116 and 120. If a decimal amount receiving totalizer 650 is selected, there will be no actuation of the contacts 116 and 120 in absence of the special contact operating mechanism and such contacts and controlling circuits, to be subsequently explained in detail, will be ineffective. It is also explained that, while the units transfer arm 725u will be actuated in the same way by the units wheel of either a special or ordinary totalizer, the tens transfer arm 725t will be actuated when the tens transfer tooth of the tens wheel of the decimal totalizer passes from 9 to 0 in the ordinary manner. When a special totalizer 650S is selected, such transfer arm will be actuated by alternate teeth of the tens of ounces wheel 650t.

Referring to Fig. 12 it will be noted that the rearwardly extending arm 1017 extends beneath contacts 122 and this is provided for the two lower orders. When the transfer arm 725u is rocked as the units ounce wheels pass from 9-0, its arm 1017u (Fig. 13) will be close contacts 122u and for the tens of ounces wheel it will be recalled that the transfer arm 725t will be actuated by alternate teeth of the wheel 650t, that is, each time the wheel 650t goes from 1-0 the contacts 122t (Fig. 13) will be closed by the related arm 1017t.

*Examples of operation*

As an example, with a totalizer 650S selected for actuation and assuming it to be standing at zero, "5" representing five ounces may be entered. The units ounce wheel 650u will be turned five steps but contacts 116 will remain opened. It will be noted from Fig. 20 that when the key 98S corresponding to such totalizer is depressed, its contacts 108 and 109 will be closed. Assuming, in the following operations, that the same totalizer is successively selected, for entry operations "1" representing one ounce may then be entered. Contacts 116 (Fig. 20) will now close. The previous closure of contacts 109 by key 98S will energize a relay 123 to close its contacts 123a and 123b and the closure of relay contacts 123a will cause a relay 124 to be energized (since contacts 116 are closed) which will close its contacts 124a which are now latched. Referring to Fig. 19, it will be seen that when magnet 124 is energized, the armature 126 will be attracted to close contacts 124a, and that the armature 126 will be latched by a detent plate 127 which is the armature of a restoring magnet 125. Hence, even though the units wheel subsequently passes beyond "6", contacts 123a will remain latched in closed position.

The circuit which includes the relay contacts 124a is from line 49, through cam contacts CC2, relay contacts 124a now latched closed, key operated contacts 108 now closed, and to transfer contacts 120 which are yet open because wheel 650t is at 0, so that the circuit is opened at such contacts. The three wheels now represent 0–06, and it will be assumed that 4 ounces will then be entered in the same totalizer.

The units wheel 650u now passes from 9 to 0 and in this operation a number of additional operations occur. The units wheel 650u leaves the "6" position and contacts 116 open, thus deenergizing relay magnet 124. As this wheel passes from 9 to 0, its transfer arm 725u will be rocked to close contacts 122u and the usual mechanical transfer will be effected to the tens of ounces wheel 650t. Contacts 122u close to cause relay magnet 125 to be energized to unlatch contacts 124a. The tens wheel passes from 0 to 1, thus causing contacts 120 to close. These contacts 120 are closed at the termination of the entry and the three wheels now represent 0–10, or no pounds and 10 ounces.

It will now be assumed that 8 ounces are added to the totalizer which, added to 10 ounces previously entered, would make 18 ounces, or greater than a pound. The machine now effects additional operations to convert 18 ounces to pounds and ounces. As the units wheel 650u again goes through the six position, contacts 116 close thus energizing the relay magnet 124 and causing the latching of relay contacts 124a in closed position.

Fig. 21 shows the timing for a series of cam contacts CC1, CC2, and CC3 and the cams for closing such contacts are fast to drive shaft 94. The time for opening and closing contacts 122u, 122t, 116, 120 is also shown in Fig. 21. At the time relay contacts 124a are closed, cam contacts CC2 are closed so that a circuit is now closed from line 49, through CC2, through relay contacts 124a now closed, contacts 108 now closed, contacts 120 closed because wheel 650t is at "1" (see Fig. 16), relay contacts 134a normally closed, to and through a relay magnet 131 to the line 48. Hence, relay magnet 131 will now be energized with the following effect: At the end of the entry operation the three wheels will represent 0–18 but relay magnet 131 will have been energized and an entry cycle then automatically ensues during which drive shaft 94 rotates. From Fig. 21, it will be seen that the closure of cam contacts CC2 carries over to the next cycle, thus providing a stick circuit for solenoid 131 through its contacts 131a (Fig. 20).

At the close of the "8" entry cycle, cam contacts CC1 close thus closing a circuit from the line side 49, through contacts CC1, relay contacts 131b now closed, through transfer contacts 132 now closed, through relay contacts 134b now closed, through solenoid 135 to line 48. The solenoid 135 is also shown in Fig. 4.

Figure 5:
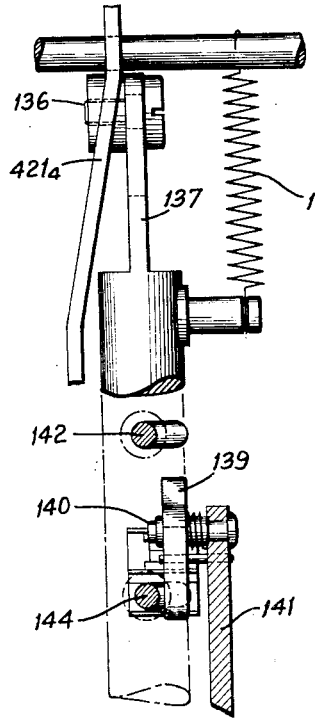
Fig. 5 is a fragmentary detail view taken on the line 5—5 of Fig. 4 of part of the electromagnetically operated mechanism for automatically effecting entry of "4" when ounces are to be converted to lbs. and oz.

From Figs. 4 and 5, it will be observed that the key stem 421 of the "4" key has pivotally connected thereto by a stud 136 the core 137 of the solenoid 135, the core being attracted within the solenoid when the latter is energized to draw the "4" key downwardly and set up the "4" pin in the same way as if the key was manually depressed.

Contacts 132 are normally latched by a latch lever 139 pivoted at 140 to a bracket 141. When the solenoid core 137 is attracted downwardly a pin 142 carried thereby will rock the lever 139 to unlatch the contacts 132, and at the same time allow contacts 133 to close. This will deenergize the solenoid 135 and the latter returns upwardly to normal by a spring. Pin 144 carried by core 137 will shift the intermediate contact blade and close contacts 132 which are thereupon relatched by a latch lever 139. While this will again tend to close the circuit to the solenoid a repeated energization thereof will have been prevented by the following means:

When the contacts 132–133 transfer a circuit will be closed through cam contacts CC1, relay contacts 131b now closed, through contacts 133, through the relay magnet 134 to cause it to open its contacts 134a and 134b, thus opening the circuit to the relay magnet 131 and solenoid 135. Relay magnet 131 is held energized through its stick contacts 131a. Relay magnet 134 also closes its stick contacts 134c completing a stick circuit extending back to line 49 through cam contacts CC3 which are now closed.

When the core 137 of the solenoid returns, contacts 132 close and thus a circuit will be closed from line 49, through contacts CC1, relay contacts 131b now closed, contacts 132 now closed, relay contacts 134a now closed, to a relay magnet 145, to the line 48. Relay magnet 145 closes its stick contacts 145a, the stick circuit being extended back to line 49 through cam contacts CC1. Relay contacts 145b close and such contacts are shunted across contacts 178, thus closing the circuit to the clutch control magnets 180 just as if the release bar was depressed in the manner previously described.

The energization of relay magnet 134 is maintained by cam contacts CC3 through the stick contacts 134c so that contacts 134b are kept open when transfer contacts 132 close to thereby prevent a repeated energization of solenoid 135 and also to keep contacts 134a closed to enable an impulse to be sent to the relay magnet 145 upon the closure of contacts 132.

From Fig. 21, it will be noted that cam contacts CC3 open early in the cycle in which the "4" is entered which would release relay 134 to cause certain operations at this time which should be prevented. This is taken care of by providing contacts 145c which are in series with the relay magnet 134 and which are closed when cam contacts CC3 open, it being noted that the maintained energization of relay magnet 145 is effected through stick contacts 145a and cam contacts CC1 which are closed at the time CC3 open. Since relay contacts 145c are closed at the time contacts CC3 open, relay magnet 134 will be kept connected across the lines 48 and 49. Hence relay magnet 134 will be maintained energized until cam contacts CC1 open but at this time cam contacts CC3 are again closed and the latter will thereby retain the relay magnet 134 energized through its stick contacts 134c until cam contacts CC3 open early in the next cycle, which is the cycle of operation following that in which the "4" is automatically entered.

In the automatically initiated cycle of the machine, a "4" will be automatically entered to be added to "18" in the lowest two adding wheels. This will cause –2– to be represented after the addition in the units wheel. As the units wheel 650u passes from 9 to 0, a transfer will be effected to the tens wheel 650t which was at "1". This will now pass to "0" and the two lowest ounce wheels will represent –02. As the tens of ounces wheel 650t passes from "1" to "0", it will actuate the related tens transfer arm 725t (see Fig. 14) and thus a unit will be transferred to the third or pounds wheel. The three wheels will now represent 1–02 or one pound, two ounces converting 18 ounces to pounds and ounces.

At the time the units wheel 650u goes from 9 to 0, it closes the contacts 122u which completes a circuit through relay magnet 125 which thereupon engages and attracts its armature 127 (Fig. 19) to unlatch contacts 124a.

Assuming that the two ounce wheels represent 10 ounces, there will be described the operation when ten ounces are added thereto. The tens of ounces wheel moves from 1 to 0 and in so doing, contacts 122t are closed by the transfer arm 725t and contacts 120 which are closed at the "1" position open when passing to the "0" position by the addition of a unit to the tens of ounces wheel. Contacts 122t close during the time for the adding operation while contacts CC2 are closed. Hence a circuit will be closed from line 49, through CC2 now closed, contacts 122t now closed, relay contacts 134a normally closed, to the relay magnet 131 to line 48. The operations thereafter are the same as previously described and effect the automatic initiation of the next cycle and the automatic entry of "4". The conversion of ounces to pounds and ounces will enable the representation of 1 pound 04 ounces. Of course, there is a transfer from the tens of ounces wheel to the first pounds wheel occasioned by the actuation of the transfer arm 725t so that the first lb. wheel will represent "1", in the problem assumed.

The circuit arrangement has been described in connection with a single special totalizer 650S and the parts involved for such totalizer have been designated in Fig. 20 and referred to. It will also be observed that contacts 116, 120, 122u and 122t are common to a series of special totalizers 650S. The circuit arrangement is obviously duplicated for each of the special totalizers 650S, particularly in the provision of relay magnets 123, 124 and 125 and this brings out the necessity for latching the contacts 124a in closed position. Whenever a relay magnet 124 associated with a special totalizer is energized and its contacts 124a latched, the same totalizer may or may not be actuated during the next operation of the machine. For instance, a particular totalizer having its relay 124 energized may go out of operation for an indefinite time while other totalizers are being employed for adding operations. Hence, the necessity for latching the contacts 124a closed to thereby store up an indication that the units wheel of the special totalizer in question has reached a 6 position is apparent. The storing up of such indication is essential so that when the totalizer is again brought into operation, the previous latching of the contacts 124a closed in conjunction with the closure of contacts 120 by the same totalizer will effect the automatic entering cycle of "4" in the manner previously described.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a calculating machine of the class in which the cyclic motor operation of the machine is effected by the operation of a motor release bar to engage the motor clutch, said calculating machine including a series of digit keys and including a "4" digit key to enter "4" in the lowest order accumulator wheel, the combination of an accumulator consisting of a series of ten toothed accumulator wheels, all of which represent 0–9 except the second order wheel which alternately represents 0–1, transfer mechanism for effecting a units carry to the next higher order wheel when the next lower order 0–9 wheel passes to 0, supplemental transfer mechanism under control of the second order wheel to transfer a unit to the next higher order 0–9 wheel each time the second order wheel passes from 1–0, control means operable conjointly under control of the lowest order wheel and the second order wheel and operated when both of said wheels represent 16, 17, 18 or 19 after an entry therein, and under control of the second order wheel alone when the latter passes from 1–0 by an entry of 1 therein and the lowest order wheel represents either 0, 1, 2, 3, 4, 5, and sequentially operated means initiated in operation by said control means comprising means to first cause the operation of the "4" digit key, and additional means operated after the operation of the "4" digit key to cause the operation of the motor clutch, whereby a subsequent cyclic motor operation of the machine ensues to enter "4" in the lowest order 0–9 accumulator wheel.

2. In a calculating machine of the class in which the cyclic motor operation of the machine is effected by the operation of a motor release bar to engage the motor clutch, said calculating machine including a ten key keyboard and a plurality of series of digit setup pins for controlling entries therein, the combination of an accumulator comprising a series of ten toothed accumulator wheels, all of which represent 0–9 except the second order wheel which alternately represents 0–1, transfer mechanism for effecting a units carry to the next higher order wheel when the next lower order 0–9 wheel passes to 0, supplemental transfer mechanism under control of the second order wheel to transfer a unit to the next higher order 0–9 wheel each time the second order wheel passes from 1–0, control means operable conjointly under control of the lowest order wheel and the second order wheel and operated when both of said wheels represent 16, 17, 18 or 19 after an entry therein, and under control of the second order wheel alone when the latter passes from 1–0 by an entry of 1 therein and the lowest order wheel represents 0, 1, 2, 3, 4, or 5, and sequentially operated means initiated in operation by said control means comprising means to first cause the operation of the "4" digit key of said ten key keyboard to set the "4" digit pin of the series controlling the entry in the lowest order wheel and additional means operated after the operation by said "4" digit key to cause the operation of the aforesaid motor clutch, whereby a subsequent cyclic motor operation of the machine ensues to enter "4" under control of the "4" digit setup pin in the lowest order 0–9 accumulator wheel.

3. In a calculating machine of the class described in which the cyclic motor operation of the machine is effected by the operation of a motor release bar to engage the motor clutch, said calculating machine including a series of digit keys and including a "4" digit key to enter "4" in the lowest order accumulator wheel, the combination of an accumulator for accumulating amounts according to lbs. and oz. comprising a units oz. wheel, a tens oz. wheel alternately representing 0 and 1 and a series of lbs. wheels of successively higher denominational order, transfer means to effect a unit carry to a lb. wheel of higher denominational order when a lb. wheel of lower denominational order passes from 9-0, all of said lbs. and oz. wheels having ten teeth for entry purposes, transfer mechanism intermediate said units and tens oz. wheel to move said tens oz. wheel to "1" from "0" actuated under control of said units oz. wheel in passing from 9 to 0, transfer mechanism intermediate the tens oz. wheel and the first lb. wheel actuated under control of said tens oz. wheel upon the latter passing from "1" to "0," electrical contact means set under control of said units oz. wheel when the latter is at "6" or has gone beyond to represent either 7, 8 or 9, supplemental electrical contact means set under control of said tens oz. wheel when the latter passes from 0 to 1, and additional contact means set by said last named transfer mechanism when the tens oz. wheel passes from 1-0, an electromagnet to effect the operation of said motor clutch, a relay energized jointly under control of the first named electrical contact means when the latter is set by the units oz. wheel representing 6, 7, 8 or 9 and the supplemental electrical contact means when the latter is set by the tens oz. wheel at 1, and under control of the additional contact means alone when the tens oz. wheel passes from 1 to 0 by an entry of 1 therein and said units oz. wheel represents either 0, 1, 2, 3, 4, or 5, means initiated in operation by said relay for effecting the operation of electromagnetic means to cause the operation of the "4" digit key, and means initiated in operation by said electromagnetic means to cause the operation of said electromagnet to operate said motor clutch, whereby the cyclic motor operation of said machine ensues to enter "4" in the lowest order wheel.

SAMUEL BRAND.